United States Patent
Van der Laan et al.

[19]

[11] Patent Number: 5,929,761
[45] Date of Patent: Jul. 27, 1999

[54] PERSONAL ALARM SYSTEM

[75] Inventors: Robert Lambertus Van der Laan, Leidschendam; Aart Hendrik Van der Leer, Barendrecht, both of Netherlands

[73] Assignee: Siemens Nederland N.V., Den Haar, Netherlands

[21] Appl. No.: 09/000,074

[22] PCT Filed: Aug. 2, 1996

[86] PCT No.: PCT/NL96/00313

§ 371 Date: Jan. 22, 1998

§ 102(e) Date: Jan. 22, 1998

[87] PCT Pub. No.: WO97/06628

PCT Pub. Date: Feb. 20, 1997

[30] Foreign Application Priority Data

Aug. 3, 1995 [NL] Netherlands ............... 1000927

[51] Int. Cl.$^6$ ................................ G08B 23/00
[52] U.S. Cl. ................ 340/573.1; 340/539; 379/38
[58] Field of Search ............... 340/573.1, 572.8, 340/539, 825.49, 825.54, 825.36; 379/38, 42, 49

[56] References Cited

U.S. PATENT DOCUMENTS

| | | | |
|---|---|---|---|
| 4,829,285 | 5/1989 | Brand et al. | 340/573 |
| 5,206,897 | 4/1993 | Goudreau et al. | 340/573 |
| 5,650,770 | 7/1997 | Schlager et al. | 340/573 |
| 5,652,570 | 7/1997 | Lepkofker | 340/573 |
| 5,729,203 | 3/1998 | Oka et al. | 340/573 |
| 5,731,757 | 3/1998 | Layson, Jr. | 340/573 |
| 5,742,233 | 4/1998 | Hoffman et al. | 340/573 |

*Primary Examiner*—Nina Tong
*Attorney, Agent, or Firm*—Merchant & Gould P.C.

[57] ABSTRACT

There is described an alarm system (1) comprising: a carrier unit (10; a base unit (30) having an in-output (31) for coupling to a communication network (P); an alarm monitoring station (100) coupled to that communication network (P); wherein the carrier unit (10) comprises a transmitter (20) and an alarm switch (13) coupled to an alarm input (23) of the transmitter (20). By operating the alarm switch (13), the base unit (30) is wirelessly activated by the carrier unit (10). Accordingly, the base unit (30) makes connection with the communication network (P) and selects the access number of the alarm monitoring station (100). In accordance with the invention, the transmitter (20) comprises a microphone input (24) coupled to a microphone (14). Speech signals from the user are wirelessly transmitted by the transmitter (20) to the base unit (30), which transmits these speech signals via the communication network (P) to the alarm monitoring station (100).

7 Claims, 1 Drawing Sheet

PERSONAL ALARM SYSTEM

FIELD OF THE INVENTION

The invention relates to a social alarm system as described in the preamble of claim 1. Such an alarm system is known in practice.

BACKGROUND OF THE INVENTION

Such a system is particularly intended for the security of vulnerable persons living alone, such as for instance elderly persons. In his or her living environment, everyone runs the risk of having an accident whereby one may become immobilized. Such an accident may in itself be relatively innocent: for instance, one may slip in the bathroom or trip in the living room. The consequences, however, may be serious: one may for instance break a leg or hip, so that one cannot move anymore. At that moment, one is dependent on assistance from other people; persons living alone should then try to draw the attention of their neighbors, which may take a long time if one is no longer capable of operating a telephone either.

It will be understood that such a risk of injury is particularly present with elderly people. It may even be the case that elderly people no longer dare to live alone, and for that reason move to an old people's home, while this would in itself not be necessary.

An alarm system of the above-mentioned type solves such problems, because it offers the person in question a possibility of summoning help, for whatever reason, from the place where that person is located at that moment. The only thing that this person should do for that purpose is operate the alarm switch of his carrier unit.

In response to the operation of the alarm switch, the carrier unit generates a signal which is wirelessly transmitted to the base unit (radio transmission). The base unit is connected with a communication network, for instance the public telephone network. In response to the received signal, the base unit sets up a connection with the alarm monitoring station. This alarm monitoring station for instance consists of a central reporting room of an alerting organization or a house, of family or acquaintances of the user of the alarm system, with a communication network connection. Depending on the circumstances and the advancement of the system used, different reactions are now possible. Generally, an operator is present at the alarm monitoring station, who sends assistance to the user who raised alarm. This operator is for instance an assistant of the alerting organization or family or an acquaintance of the user of the alarm system. In this connection, it is desired that communication be possible between the operator and the user, on the one hand to comfort the user and to assure him that his message has been received, on the other hand to enable establishing the reason of the alarm call. Depending on that reason, the operator can send specialized assistance, for instance a doctor or even an ambulance.

Thus, an alarm system offers the important advantage that in the event of a calamity, assistance can be summoned promptly at all times. A further important advantage precisely resides in knowing that assistance can be summoned promptly if a calamity occurs, and that very knowledge is a reassurance, even if the person in question never has to employ the emergency call facility. An important consequence is that elderly persons can continue living on their own for a longer time and also feel safe in doing so, which contributes to their joy of life.

In the known system, this communication takes place by means of one or more microphones and loudspeakers which are positioned in the user's house and connected to the base unit.

A number of drawbacks are associated herewith. Because, from the nature of things, the number of microphones is limited, the audibility of the user to the operator depends on the place where the user is located. Under certain circumstances, it is then even possible that the operator cannot hear the user. This situation occurs in particular if the user is not located in a space wherein a microphone of the alarm system is provided, or if the user, as a consequence of the emergency situation which formed the cause for calling in help, is unable to speak loudly. In order to avoid this risk as much as possible, the installation of the microphones should be handled with great consideration.

SUMMARY OF THE INVENTION

The object of the invention is to overcome these drawbacks. More in particular, the object of the present invention is to provide an improved alarm system, wherein the audibility of the user is guaranteed under all circumstances, and wherein the time-consuming installation of several microphones can be omitted.

To that end, in accordance with the invention, the alarm system of the above-mentioned type has the characterizing features as described in the characterizing part of claim 1.

British patent application describes a security system for a factory site or the like, wherein a guard is provided with a walkie-talkie-like transmission/reception unit comprising an emergency button. When that emergency button is operated, a central unit tries to get in touch with a subscriber, via the telephone network, by selecting a pre-programmed subscriber number. That subscriber can be regarded as a guard on call-duty; also via remote control, he can interfere with the manufacturing process. However, that called-up subscriber cannot communicate, via that telephone network, with the walkie-talkie-like transmission/reception unit that raised the alarm.

German Offenlegungsschrift 3,324,517 describes a system wherein a user has a portable alarm device and wherein, after operation of an alarm button, a speech connection is established between the user and a central station. However, the speech connection and the alarm call are established via the same channel. This has the drawback that a channel allowed for speech connection has to be used, involving the risk that the alarm signal is subject to interference.

BRIEF DESCRIPTION OF THE DRAWINGS

The above-mentioned and other aspects, characteristic features and advantages of the present invention will be explained by the following description of a preferred embodiment of an alarm system according to the invention, with reference to the accompanying drawing, wherein.

DETAILED DESCRIPTION OF PREFERRED EMBODIMENTS

Figure 1:
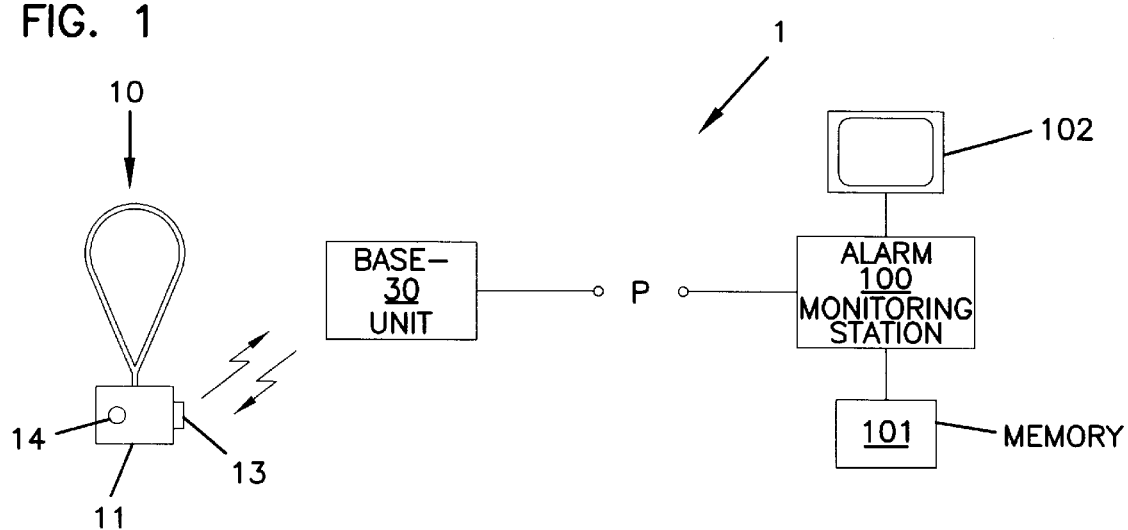
FIG. 1 shows a block diagram of an alarm system according to the present invention.
Figure 2:
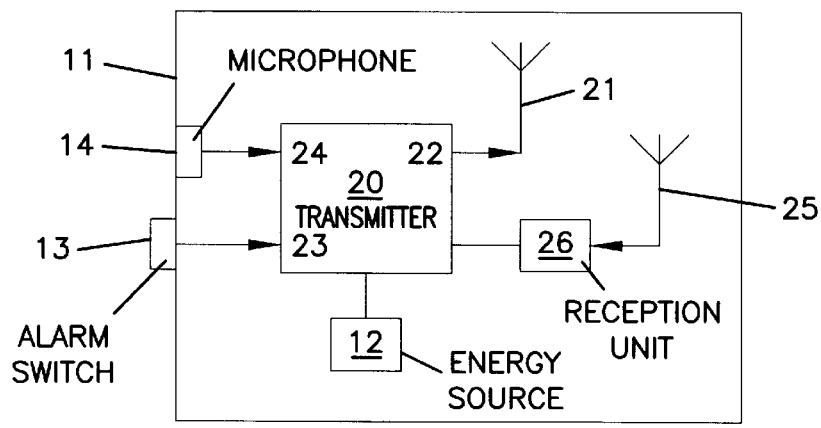
FIG. 2 shows a block diagram of a carrier unit.
Figure 3:
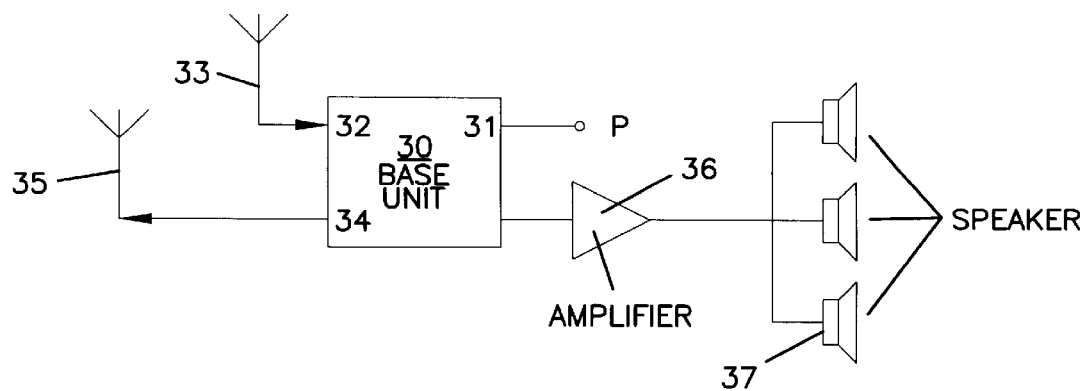
FIG. 3 shows a block diagram of a base unit.

In FIG. 1, an alarm system according to the present invention is generally designated by reference numeral 1. The alarm system 1 comprises a carrier unit 10, intended for being carried by a user in an easy and socially acceptable manner at all times. The carrier unit 10 has a form suiting that purpose, such as for instance the form of a bracelet or necklace, but other forms are conceivable as well.

The carrier unit 10 comprises a housing 11 wherein a transmitter 20 is disposed, fed by an energy source 12, such as a battery. The transmitter 20 has an output 22 and is adapted to transmit, via a transmission antenna 21, electromagnetic signals on a frequency band suitable and allowed therefor, for instance via FM-modulation, as is known per se.

Mounted on the housing 11 is an alarm switch 13, for instance a push button, connected to an activating input 23 of the transmitter 20. The alarm switch 13 can be protected against unintentional operation, for instance by a protective cover arranged over it, or by a locking catch; for simplicity's sake, this protection is not illustrated. Further, a microphone 14 is mounted in the housing 11, connected to a microphone input 24 of the transmitter 20.

The alarm system 1 further comprises a base unit 30, installed in or at the user's house at a fixed position. The base unit 30 has a combined in/output 31 connected with a communication network P. This can be the public telephone network or the network of a private branch exchange, but also the cable network of a central antenna device or a network of radio connections. The base unit 30 further has an input 32 connected to a reception antenna 33, for receiving the signals generated by the transmitter 20.

The alarm system 1 further comprises an alarm monitoring station 100, which is also connected with the public communication network P. At the alarm monitoring station, an operator is present, i.e. a person who can handle the incoming alarm calls.

Normally, the transmitter 20 and the base unit 30 are inactive, which means that they do not transmit any signals.

The transmitter 20 becomes active in response to the reception, at its alarm input 23, of an alarm signal coming from the alarm switch 13. This can simply be the closing of a contact. In this active mode, the transmitter 20 first transmits, at its output 22, an activating signal for the base unit 30. This activating signal can, in a simple form, be the presence of a carrier wave of a predetermined frequency, but preferably, a predetermined code is transmitted with that carrier wave, which code is identified by the base unit 30.

In response to the reception of an activating signal at its input 32, the base unit 30 becomes active as well.

In a simple embodiment, the transmitter 20 can continue transmitting the activating signal until the transmitter 20 is manually reset into the inactive state, for which purpose the carrier unit 10 may comprise a reset button, not shown. However, the communication path between the carrier unit 10 and the base unit 30 is preferably a two-way communication path, for which purpose the base unit 30 comprises an output 34 and a transmission antenna 35, and for which purpose the carrier unit 10 comprises a reception antenna 25 and a reception unit 26. The frequency for the communication from the carrier unit 10 to the base unit 30 may differ from the frequency for the communication from the base unit 30 to the carrier unit 10. In such an embodiment, the base unit 30 can transmit an acknowledge signal to the carrier unit 10 to indicate that the activating signal has been received, so that the transmitter 20 can terminate the transmission of the activating signal.

Optionally, the user can be visually informed of this acknowledgement by means of an LED (not shown for simplicity's sake) included in the housing and operated by the reception unit 26 of the carrier unit 10.

In the active mode, the base unit 30 also makes a connection with the communication network P and takes actions to gain access to the alarm monitoring station 100, as is known per se. When the connection with the alarm monitoring station 100 is established, the base unit 30 transmits an identification code to the alarm monitoring station 100. Associated with the alarm monitoring station 100 is a memory 101 containing information relating to subscribers to the alarm system, and in response to the reception of a valid identification code, information relating to the calling person is made available to the operator, for instance on a display 102, which information may comprise, inter alia, the name and address of the calling person, as well as data of persons and/or authorities that have to be warned in respect of that particular calling person.

In principle, it is now possible that the calling person and the operator communicate with each other. However, it is preferred that this speech communication can only be established after acceptance of the call by the operator. For this purpose, the operator transmits an acceptance signal to the base unit 30 via the communication network P.

In response to the reception of the acceptance signal from the alarm monitoring station 100, the base unit 30 can transmit an acceptance-acknowledge signal to the carrier unit 10, on which an indication LED can visually inform the user of the acceptance of the call by the alarm monitoring station.

Further, in response to the reception of the acceptance signal from the alarm monitoring station, a speech channel is opened for speech communication from the user to the alarm monitoring station 100. The transmitter 20 then transmits the signals from the microphone 14 received at its microphone input 24 to the base unit 30, via a carrier wave whose frequency differs from the frequency of the carrier wave used for the alarm call. The base unit 30 demodulates the signals received at its input 32, and couples the demodulated signal through to its output 31, so that this signal, containing the speech signal from the user, can reach the alarm monitoring station 100 via the communication network P.

Communication from the operator to the user is possible because the base unit 30 couples speech signals coming from the alarm monitoring station 100 through to an amplifier 36, to which loudspeakers 37 are connected which are positioned at strategic locations in the user's house.

When communication between the user and the operator is no longer necessary, the speech connection is broken on the operator's initiative. For that purpose, the operator transmits a terminating signal to the base unit 30. In response to the reception of the terminating signal, the base unit 30 breaks the connection with the communication network, transmits a deactivating signal to the carrier unit 10 and, in response to this signal, returns into the inactive state.

If the base unit 30 is provided with a microphone as well and/or if other microphones are present, it is also possible for the operator to deactivate the speech channel between the carrier unit 10 and the base unit 30 only, so that speech is only possible via the microphone in the base unit 30 or the other microphone(s). This may be desired in the case where the audibility via the microphone 14 in the carrier unit 30 is insufficient for whatever reason.

As has already been observed, it is preferred that as long as the operator has not yet transmitted the acceptance signal, the speech connection from the user to the alarm monitoring station 100 be interrupted. This interruption may consist in the base unit 30 not coupling the signals received at its input 32 through to its output 31, or the transmitter 20 not transmitting at its output 21 the microphone signals received at its microphone input 24.

As has already been observed, the carrier wave frequency for the speech connection differs from the carrier wave frequency for transmitting the alarm call. More in particular, for transmitting the alarm call, a carrier wave frequency is used that is especially reserved for alarm signals, which means that, normally, the use of this channel will be particularly low, so that the chance of interference will be particularly small, which increases the chances of prompt reception of the alarm call. This alarm-carrier wave frequency may differ from country to country; by way of example, in the Netherlands this frequency is 456 MHz, in Belgium 457 MHz, and in Germany 469 MHz.

For further increasing the chances of a prompt reception of the alarm call signal, this signal, after the operation of the alarm button 13, is continuously transmitted by the transmitter 20 until the acceptance signal from the alarm monitoring station 100 has been received. After that, the speech channel is opened, via a frequency band allowed for speech transmission.

It will be readily understood by anyone skilled in the art that it is possible to alter or modify the embodiment shown of the device without departing from the inventive concept or the protective scope. For instance, it is possible that a loudspeaker is also accommodated in the carrier unit 10.

Further, it is possible that the reception and transmission antennae 21,25 and 33,35 respectively are integrated into transmission/reception antennae.

We claim:

1. A social alarm system (1) comprising:

a carrier unit (10) intended for being carried by a user;

a base unit (30) intended for being positioned at a fixed location, said base unit (30) having an in/output (31) for coupling to a communication network (P);

an alarm monitoring station (100) coupled to said communication network (P);

wherein the carrier unit (10) comprises:
  a transmitter (20) having a transmission output (22) and an alarm input (23);
  an alarm switch (13) coupled to the alarm input (23) of the transmitter (20);
  wherein the transmitter (20) is adapted to transmit an activating signal for the base unit (30) in response to the reception of an alarm signal at its alarm input (23);

wherein the base unit (30) comprises:
  an input (32) for receiving signals transmitted by the transmitter (20);
  means responsive to the reception of an activating signal at the input (32) for making connection with the communication network (P) and gaining access to the alarm monitoring station (100);
  means (31, 36, 37) for rendering audible speech signals from the alarm monitoring station (100), received via the communication network (P);

and wherein means are provided for transmitting sound signals coming from the user to the alarm monitoring station (100);

characterized in:

that the carrier unit (10) comprises a microphone (14);

that the transmitter (20) comprises a microphone input (24) coupled to the microphone (14);

that the transmitter (20) comprises an output (22, 21) for transmitting the sound signals received at its microphone input (24); and that the base unit (30) comprises means (33, 32) for receiving the sound signals transmitted by the transmitter (20);

wherein the transmitter (20) is adapted to transmit the activating signal to the base unit (30) by means of a first carrier wave of a first frequency exclusively allowed for alarm purposes, and to transmit the sound signals received at its microphone input (24) to the base unit (30) by means of a second carrier wave of a second frequency allowed for speech connection, different from the first frequency.

2. An alarm system according to claim 1, wherein the transmitter (20) is adapted to continuously transmit the activating signal to the base unit (30), until an acceptance signal has been received from the alarm monitoring station (100).

3. An alarm system according to claim 1, wherein the base unit (30) is adapted to demodulate the second carrier wave for recovering the sound signals.

4. An alarm system according to claim 1, wherein means are provided to ensure that a sound-transmitting connection from the microphone (14) to the alarm monitoring station (100) is not established until the alarm monitoring station (100) has transmitted an acceptance signal to the base unit (30) via the communication network (P).

5. An alarm system according to claim 4, wherein the base unit (30) is adapted to release a communication path from its input (32) to its output (31) in response to the reception of the acceptance signal from the alarm monitoring station (100).

6. An alarm system according to claim 4, wherein the base unit (30) is adapted to transmit an acceptance-acknowledge signal to the carrier unit (10) in response to the reception of the acceptance signal from the alarm monitoring station (100), and wherein the carrier unit (10) is adapted to release a communication path from its microphone input (24) to its output (21) in response to the reception of the acceptance-acknowledge signal from the base unit (30).

7. An alarm system according to claim 1, wherein the alarm monitoring station (100) is adapted to transmit a terminating signal to the base unit (30) via the communication network (P);

wherein the base unit (30) is adapted to transmit a deactivating signal to the carrier unit (10) in response to the reception of the terminating signal from the alarm monitoring station (100); and wherein the carrier unit (10) is adapted to return into its inactive state in response to the reception of the deactivating signal from the base unit (30).

* * * * *